(12) United States Patent
Birdsall

(10) Patent No.: US 11,649,927 B2
(45) Date of Patent: May 16, 2023

(54) DUAL-INLET VALVE REFILLING OF A SINGLE FUEL CYLINDER

(71) Applicant: Toyota Motor Engineering & Manufacturing North America, Inc., Plano, TX (US)

(72) Inventor: Jacquelyn Birdsall, Pasadena, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 267 days.

(21) Appl. No.: 16/777,021

(22) Filed: Jan. 30, 2020

(65) Prior Publication Data
US 2021/0239270 A1    Aug. 5, 2021

(51) Int. Cl.
*F17C 1/08*       (2006.01)
*F17C 13/04*      (2006.01)
(Continued)

(52) U.S. Cl.
CPC ............. *F17C 1/08* (2013.01); *B67D 7/04* (2013.01); *F17C 5/06* (2013.01); *F17C 13/04* (2013.01);
(Continued)

(58) Field of Classification Search
CPC .... F17C 1/08; F17C 5/06; F17C 13/04; F17C 2201/0109; F17C 2201/035;
(Continued)

(56) References Cited

U.S. PATENT DOCUMENTS

| 2,518,569 | A | * | 8/1950 | Pierson | F17C 13/04 48/192 |
| 4,085,865 | A | * | 4/1978 | Thompson | B67D 1/0462 220/720 |

(Continued)

FOREIGN PATENT DOCUMENTS

| KR | 1020080052909 A | 6/2008 |
| KR | 1020090022958 A | 3/2009 |
| KR | 1020170118510 A | 10/2017 |

OTHER PUBLICATIONS

Reddi, K. et al., "Impact of hydrogen SAE J2601 fueling methods on fueling time of light-duty fuel cell electric vehicles," Energy Systems Division, Argonne National Laboratory and Fuel Cell Technologies Office, U.S. Department of Energy (2017) 23 pages.

(Continued)

*Primary Examiner* — Atif H Chaudry
(74) *Attorney, Agent, or Firm* — Christopher G. Darrow; Darrow Mustafa PC

(57) ABSTRACT

A fuel cylinder, such as a high-pressure fluid storage tank, is provided with dual-inlet refilling capabilities. The storage tank may include a main body section with a first domed end portion and a second domed end portion disposed at opposite portions of the main body section. A first inlet assembly and a second inlet assembly are provided at the respective first domed end portion and the second domed end portion. Each inlet assembly is configured to provide fluid communication between a supply of a high-pressure fluid and an interior of the storage tank. Each inlet assembly may include a boss and a tank valve, with each tank valve being in fluid communication with the compressed fluid receptacle. During filling of the storage tank, the high-pressure fluid travels through a compressed fluid receptacle and enters the interior of the storage tank simultaneously through each of the first and second inlet assemblies.

21 Claims, 8 Drawing Sheets

(51) Int. Cl.
   *F17C 5/06*   (2006.01)
   *B67D 7/04*   (2010.01)
(52) U.S. Cl.
   CPC .............. *F17C 2201/0109* (2013.01); *F17C 2201/035* (2013.01); *F17C 2203/012* (2013.01); *F17C 2203/0604* (2013.01); *F17C 2203/066* (2013.01); *F17C 2203/0621* (2013.01); *F17C 2205/0142* (2013.01); *F17C 2221/012* (2013.01); *F17C 2270/0178* (2013.01)
(58) Field of Classification Search
   CPC ........ F17C 2203/012; F17C 2203/0604; F17C 2203/0621; F17C 2203/066; F17C 2205/0142; F17C 2221/012; F17C 2270/0178; B67D 7/04
   USPC .......................................................... 141/95
   See application file for complete search history.

(56) References Cited

U.S. PATENT DOCUMENTS

| | | | | |
|---|---|---|---|---|
| 5,676,180 | A * | 10/1997 | Teel | F17C 5/06 137/267 |
| 5,701,928 | A * | 12/1997 | Aoki | F17C 13/123 123/529 |
| 5,954,099 | A * | 9/1999 | Princiotta | B60P 3/055 141/18 |
| 6,786,364 | B2 * | 9/2004 | McBride | B60S 5/02 222/105 |
| 7,624,753 | B2 * | 12/2009 | Suess | B60K 15/03006 137/266 |
| 8,186,536 | B2 * | 5/2012 | Strack | F17C 1/00 220/586 |
| 9,022,246 | B2 | 5/2015 | Coors et al. | |
| 9,206,946 | B2 * | 12/2015 | Mayr | F17C 5/00 |
| 9,879,825 | B2 | 1/2018 | Kaneko et al. | |
| 9,897,255 | B2 | 2/2018 | Coors et al. | |
| 10,236,522 | B2 | 3/2019 | O'Brien et al. | |
| 10,473,266 | B2 | 11/2019 | Kondo | |
| 2005/0061371 | A1 | 3/2005 | Kimbara et al. | |
| 2006/0033322 | A1 * | 2/2006 | Suess | B60K 15/07 280/830 |
| 2006/0107827 | A1 * | 5/2006 | Richards | F41H 9/02 86/50 |
| 2008/0209916 | A1 * | 9/2008 | White | F17C 7/02 62/48.1 |
| 2010/0167155 | A1 | 7/2010 | Kim et al. | |
| 2011/0127263 | A1 * | 6/2011 | Lee | F17C 13/12 220/89.2 |
| 2012/0214088 | A1 * | 8/2012 | Breuer | F17C 1/00 429/515 |
| 2012/0291902 | A1 * | 11/2012 | Mori | B60K 15/07 138/40 |
| 2013/0133780 | A1 * | 5/2013 | De Villemeur | F17C 5/005 141/4 |
| 2014/0012444 | A1 * | 1/2014 | Wake | B60L 58/30 701/22 |
| 2016/0348845 | A1 * | 12/2016 | Bowman | F17C 1/06 |
| 2017/0059089 | A1 * | 3/2017 | Uchida | F17C 13/02 |
| 2017/0145961 | A1 * | 5/2017 | Myers | B61D 17/00 |
| 2018/0259127 | A1 | 9/2018 | Manousiouthakis et al. | |
| 2018/0320822 | A1 | 11/2018 | Mathison | |
| 2018/0347054 | A1 | 12/2018 | Prescott et al. | |
| 2019/0120431 | A1 * | 4/2019 | Carroll | F17C 5/00 |
| 2019/0226641 | A1 * | 7/2019 | Ogiwara | F17C 1/06 |
| 2019/0226642 | A1 * | 7/2019 | Knight | F17C 1/00 |
| 2019/0277448 | A1 * | 9/2019 | Krogsgaard | F17C 13/04 |
| 2020/0223684 | A1 * | 7/2020 | Natori | F17C 13/026 |
| 2020/0238822 | A1 * | 7/2020 | Milton | F17C 13/084 |
| 2021/0131610 | A1 * | 5/2021 | Kim | F17C 1/10 |

OTHER PUBLICATIONS

International Search Report and Written Opinion for International Application No. PCT/US2021/013407, dated Apr. 22, 2021 (10 pages).

\* cited by examiner

DUAL-INLET VALVE REFILLING OF A SINGLE FUEL CYLINDER

TECHNICAL FIELD

The present disclosure generally relates to systems and methods for shortening the time required for the refilling of a fuel cylinder such as a high-pressure storage tank and, more particularly, to providing a high-pressure storage tank with more than one inlet for simultaneous filling.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Fuel cell, hydrogen, electric, hybrid, and other alternative powered vehicles are becoming increasingly more popular and desirable. Various high pressure storage tanks, such as refillable fuel cylinders, may be used to store necessary compressed gas fuels, such as hydrogen. As hydrogen-powered vehicles become larger and in more demand such as with 18-wheeler trucks, mobile units, large trailers, etc., fuel capacity will also become more in more demand. However, fill rates of the storage tanks at refilling stations will be limited by current components and filling systems. For example, current methods of pumping hydrogen gas into a storage tank of a vehicle often involves filling one or more storage tanks, sometimes of equal dimensions, with the incoming hydrogen gas flowing from a compressed fluid receptacle to a connector that simultaneously fuels the storage tanks through a single inlet pipe to each tank. The current design layout of each storage tank having one inlet limits the rate of filling up the storage tanks.

Accordingly, there is a need to achieve faster filling rates and overall refueling times. It would be desirable to provide faster, more efficient, and less costly methods of refilling storage tanks, while still using universal pumps and existing refueling components in order to optimize cost and design flexibility.

SUMMARY

This section provides a general summary of the disclosure, and is not a comprehensive disclosure of its full scope or all of its features.

In various aspects, the present teachings provide a high-pressure fluid storage tank assembly with dual-inlet refilling. The storage tank may include a main body section with a first domed end portion and a second domed end portion disposed at opposite portions of the main body section. A first inlet assembly and a second inlet assembly are provided at the respective first domed end portion and the second domed end portion. Each inlet assembly may be configured to provide fluid communication between a supply of a high-pressure fluid and an interior of the storage tank. In various aspects, each inlet assembly may include a tank valve disposed within a boss, with each tank valve being in fluid communication with the compressed fluid receptacle. During filling of the storage tank, the high-pressure fluid travels through a compressed fluid receptacle and enters the interior of the storage tank simultaneously through each of the first and second inlet assemblies.

In other aspects, the present teachings provide a dual-inlet system for refilling a high-pressure fluid storage tank. The system includes a high-pressure fluid storage tank including a main body section and defining an interior for storing a high-pressure fluid. The system includes a compressed fluid receptacle configured for receiving a high-pressure fluid from a supply source. The storage stank is provided with a first inlet assembly and a second inlet assembly. Each inlet assembly is configured to provide fluid communication between the compressed fluid receptacle and the interior of the storage tank. During filling of the storage tank, the high-pressure fluid travels through the compressed fluid receptacle and enters the interior of the storage tank simultaneously through each inlet assembly. In various aspects, the storage tank includes a first domed end portion and a second domed end portion disposed at opposite portions of the main body section that cooperate to define the interior. The first inlet assembly is located in the first domed end portion, and the second inlet assembly is located in the second domed end portion.

In still other aspects, the present teachings provide a method for refilling a high-pressure fluid storage tank. The method includes providing a high-pressure fluid storage tank including: a main body section defining an interior for storing a high-pressure fluid, a first inlet assembly, and a second inlet assembly. The method includes connecting a supply of a high-pressure fluid to a compressed fluid receptacle in fluid communication with the first and second inlet assemblies. Once connected, the method includes directing the high-pressure fluid to the interior of the storage tank simultaneously through each of the first and second inlet assemblies. The method may include directing the high-pressure fluid to the interior of the storage tank simultaneously through each of the first and second inlet assemblies at substantially the same flow rate. In various aspects, the high-pressure fluid may be hydrogen gas, and the high-pressure storage tank is disposed in a vehicle.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally relates to designs of fuel cylinders, such as high-pressure storage tanks, and methods for shortening the time required for refilling the high-pressure storage tanks at fueling stations, all while still using universal pumps and existing refueling components in order to optimize cost and design flexibility. The designs of the present technology provide for high-pressure storage tanks with dual-inlets for simultaneous refilling capabilities. For example, the high-pressure storage tank can be provided with a main body section with a first domed end portion and a second domed end portion disposed at opposite portions of the main body section. A first inlet assembly and a second inlet assembly may be provided at the respective first domed end portion and the second domed end portion. Each inlet assembly may be configured to provide fluid communication between a supply of a high-pressure fluid and an interior of the storage tank. In various aspects, each inlet assembly may include a tank valve disposed in a boss, with each tank valve being in fluid communication with the compressed fluid receptacle. During filling of the storage tank, the high-pressure fluid travels through a compressed fluid receptacle and enters the interior of the storage tank simultaneously through each of the first and second inlet assemblies. In various aspects, the high-pressure fluid may be provided into the interior of the storage tank at substantially the same flow rate through each inlet assembly.

Figure 1:
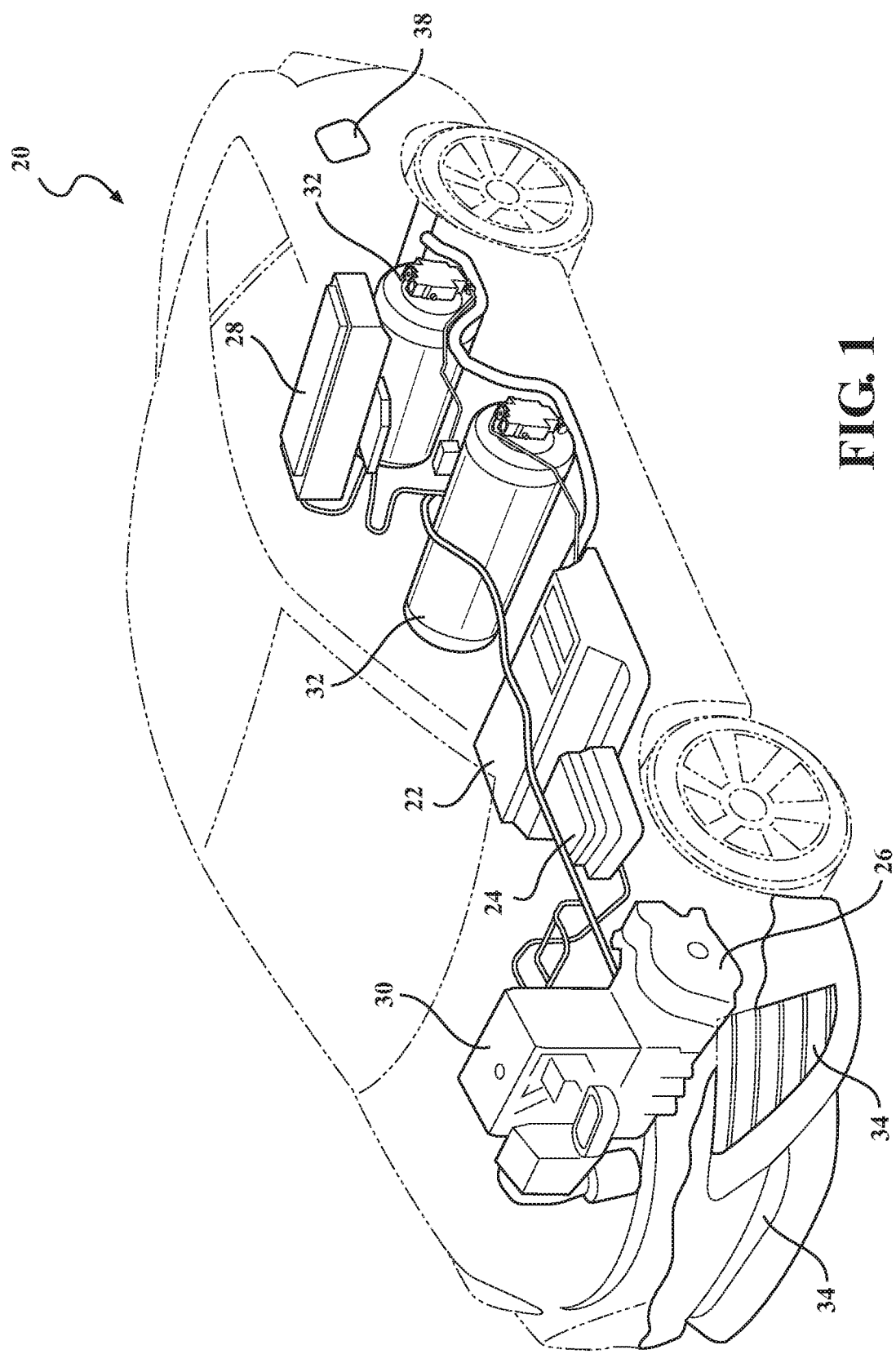
FIG. 1 is a side perspective view of an exemplary fuel cell powered vehicle, schematically illustrating a general location of various components related to the operation of the vehicle.

In order to gain a more complete understanding of the present technology, reference is made to FIG. 1, which is a side perspective view of an exemplary fuel cell powered vehicle 20, schematically illustrating a general location of various components related to the operation of the vehicle 20. As shown, the vehicle 20 includes a fuel cell stack 22 and optional fuel cell boost converter 24 that generate electricity to power an electric motor 26 and charge a drive battery 28. A power control unit (PCU) 30 is provided to control various operations of the fuel cell stack 22, drive battery 28, and electric motor 26. The vehicle 20 includes at least one high-pressure storage tank 32, such as a fuel cylinder for compressed hydrogen gas (CHG), or another high pressure fluid.

It should be understood that while the present technology may be specifically referenced herein with regard to use of the high-pressure storage tanks 32 with compressed hydrogen gas for vehicles, the present technology is also useful with the storage and refilling of various other high-pressure fluids, and is not limited to storage tanks used with vehicles. As used herein, the term "vehicle" is not meant to be limiting or construed narrowly, and should include all types of things used for transporting people or goods, with non-limiting examples including a car, truck, motorcycle, off-road vehicle, bus, boat, airplane, helicopter, lawn mower, recreational vehicle, amusement park vehicle, farm vehicle, construction vehicle, tram, golf cart, train, trolley, and the like. It should also be understood that use of the term "vehicle" is meant to include all types of powered vehicles, including electric vehicles, hybrid vehicles, and conventional fuel powered vehicles that may also include one or more high-pressure storage tank.

The details of the fuel cell stack 22 may vary by design requirements. In various aspects, the fuel cell stack 22 may utilize a polymer electrolyte membrane (PEM) type fuel cell that optimizes a compact size along with a top level output density. As is known in the art, the fuel cell stack 22 produces electricity using a chemical reaction between hydrogen and oxygen. The hydrogen may be provided as a gas from an appropriate fuel cylinder such as a high-pressure storage tank 32 located in the vehicle 20, while the oxygen is generally obtained from the environmental air the flows through front intake grills 34 of the vehicle 20. Each PEM fuel cell uses a membrane allowing hydrogen's positive ions to combine with oxygen, forcing the hydrogen's electrons to follow an outer circuit, creating an electric charge. The resulting byproducts of the reaction include water, steam and heat that is expelled by the vehicle as an exhaust using known techniques. In various aspects, the fuel cell stack 22 output may be greater than about 100 kW, with a power density of greater than about 3 kW/L, and the stack 22 may have an output of greater than about 150 DIN hp. The fuel cell stack 22 may include an internal circulation and humidification system.

As shown in FIG. 1, a fuel cell boost converter 24 may be provided to work with the fuel cell stack 22. The fuel cell boost converter 24 generally is a compact, high-efficiency, and high capacity converter. In various aspects, the fuel cell boost converter 24 may be used to obtain an output with a higher voltage than the input. For example, a four phase fuel cell boost converter 24 can be configured to boost the fuel cell stack voltage to about 650 V or more.

The power system may include one or more high powered drive battery 28, shown in the rear area of the vehicle 20 of FIG. 1. In various aspects, the drive battery 28 may be provided with a nickel-metal hydride chemistry, or similar technology. Generally, the drive battery 28 is provided to store energy that is recovered from deceleration of the vehicle 20. The drive battery 28 is then used to supplement the output from the fuel cell stack 22 during acceleration of the vehicle 20.

The vehicle 20 typically includes a power control unit (PCU) 30 as a mechanism for optimally controlling the fuel cell stack 22 under various different operational conditions, as well as for controlling the charging and discharging of the drive battery 28. The electric motor 26 drives the rotation of the wheels, and is driven by electricity generated by the fuel cell stack 22 and supplied by the drive battery 28, as described above.

The exemplary vehicle 20 of FIG. 1 illustrates two high-pressure storage tanks 32, which may be filled with a compressed fluid, for example, such as compressed hydrogen gas that is then used as the fuel for the fuel cell stack 22. In various aspects, the nominal working pressure is a high pressure level of about 70 MPa (about 700 bar). The storage tanks 32 of the present technology are lightweight and feature a top level tank storage density. In various aspects, the storage tanks 32 can contain approximately 5.0 kg of hydrogen, and the tank storage density can be about 5.7 wt. %. The interior space, or internal volume, of the storage tanks 32 can vary, with the interior space of the storage tanks defining a space having exemplary volumes being between about 50 L to about 65 L. As will be described in more detail below, the storage tanks 32 may be made of layers of material, built to resist punctures or rupturing in an accident. While the vehicle 20 of FIG. 1 is shown with two high-pressure storage tanks 32, the present technology can be used with any number of storage tanks 32, varying by the type and size of the vehicle. Each of the storage tanks may be located in different locations, not necessarily adjacent to one another. In various aspects, the locations of the storage tanks may be determined to allow for a low center of gravity of the vehicle.

Figure 2:
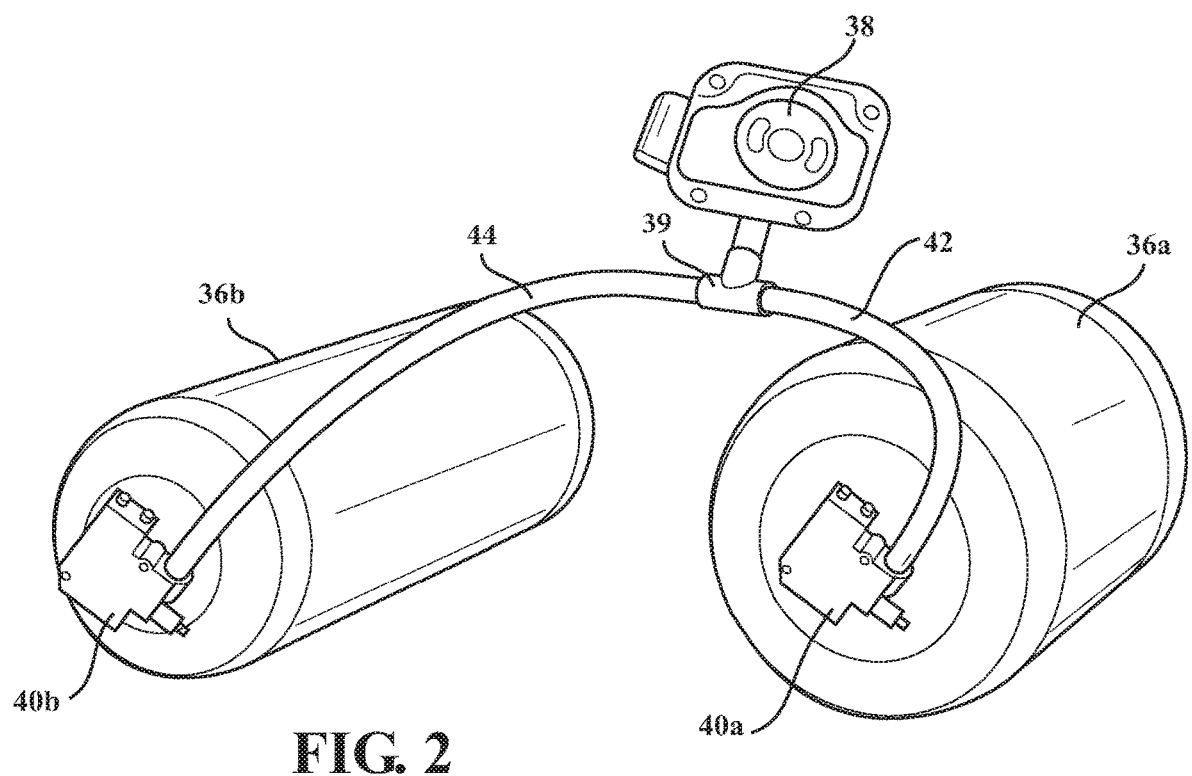
FIG. 2 is a side perspective view of a pair of single valve inlet high-pressure fluid storage tanks coupled to a compressed fluid receptacle with a three-way connection.

FIG. 2 illustrates an exemplary arrangement of the prevailing technology, providing a side perspective view of a pair of single-valve inlet high-pressure fluid storage tanks 36a, 36b coupled to a compressed fluid receptacle 38 via a three-way connection 39. As shown, the compressed fluid receptacle 38 is connected to the three-way connection 39 that provides fluid communication to an inlet assembly 40a of the first storage tank 36a via a first inlet conduit 42, and to an inlet assembly 40b of the second storage tank 36b via a second inlet conduit 44. During the refilling process, a suitable nozzle of a dispenser from a source of a compressed fluid/fuel (not shown) is coupled to an appropriate port of the compressed fluid receptacle 38. The first inlet conduit 42 provides fluid communication for the compressed fluid to enter the inlet assembly 40a of the first storage tank 36a, and the second inlet conduit 44 provides fluid communication for the compressed fluid to enter the inlet assembly 40b of the second storage tank 36b at the same time.

Figure 3A:
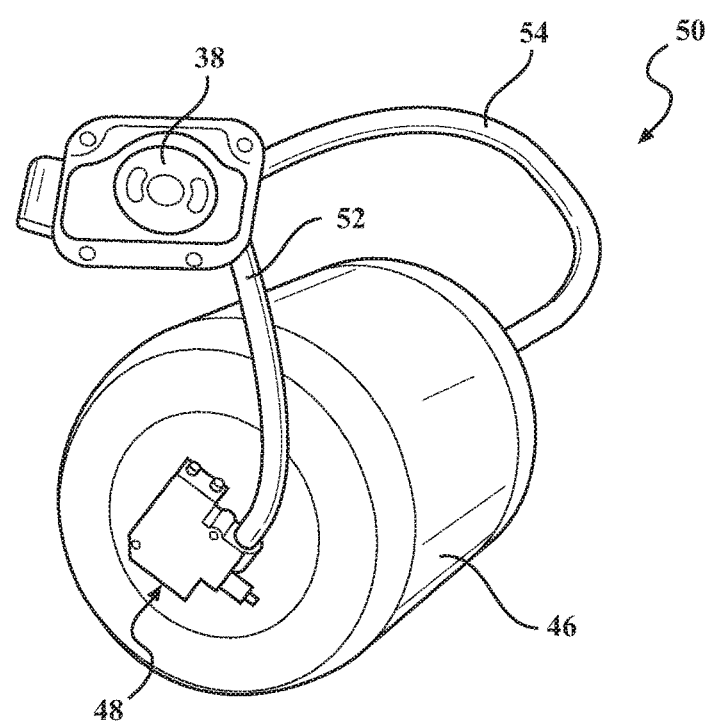
FIG. 3A is a side perspective view of a high-pressure fluid storage tank having two valve inlets coupled to the compressed fluid receptacle according to one aspect of the present technology.

FIG. 3A is a side perspective view of an exemplary dual-inlet high-pressure fluid storage tank 46 according to one aspect of the present technology. As opposed to the storage tanks 36a, 36b of FIG. 2, the dual-inlet high-pressure fluid storage tank 46 is provided having an inlet assembly located at opposing ends of the storage tank 46. As shown, the compressed fluid receptacle 38 is coupled to first and second inlet assemblies 48, 50 by first and second respective inlet conduits 52, 54. As should be understood, the shape, size, and interior volume of the inlet conduits can affect the flow of the high-pressure fluid throughout the system. For example, the longer the conduit, the further the high-pressure fluid must travel to reach the interior 56 of the storage tank 46. This may lead to a pressure drop and/or a change in the rate of flow. In various aspects, the inlet conduits 52, 54 are shaped and sized in order to ultimately provide the high-pressure fluid into the interior or 56 of the storage tank 46 at substantially the same flow rate, temperature, and/or pressure. In order to accomplish this, in certain aspects, the technology may optionally include the use of control valves or manifolds, and in some instances, the inlet conduits 52, 54 may be provided with substantially the same length and width dimensions.

Figure 3B:
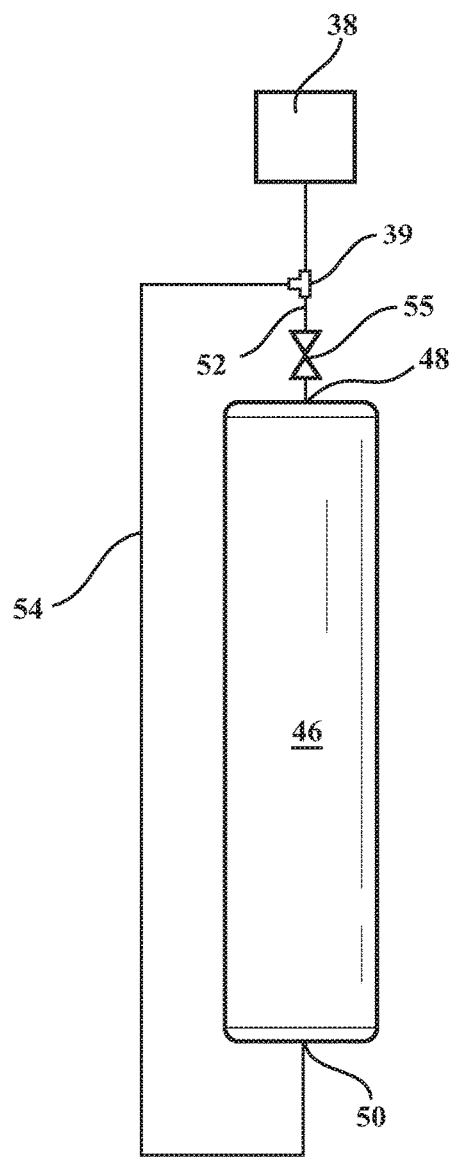
FIG. 3B is a first schematic illustration of a dual-inlet system for refilling a high-pressure fluid storage tank.
Figure 3C:
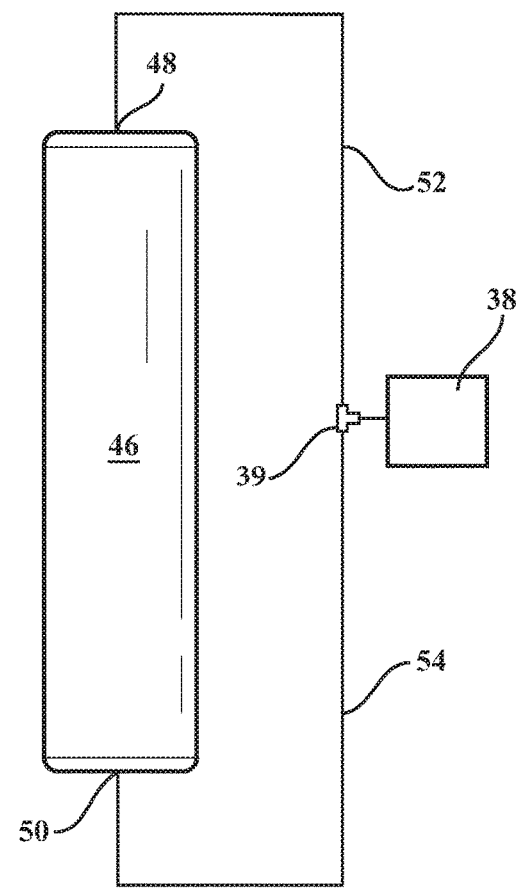
FIG. 3C is a second schematic illustration of a dual-inlet system for refilling a high-pressure fluid storage tank.

FIG. 3B is a first schematic illustration of a dual-inlet system for refilling the high-pressure fluid storage tank 46. During the refilling process, a high-pressure fluid travels from a supply (not shown), through the compressed fluid receptacle 38, and into a three-way connection 39 that directs the high-pressure fluid to a pair of inlet conduits 52, 54 to provide fluid communication to both of the first and second inlet assemblies 48, 50 that is simultaneously directed into an interior space 56 as defined by the high-pressure storage tank 46. As shown in FIG. 3B, one or more optional control valve 55 may be provided to regulate a flow of the high-pressure fluid through one or more of the inlet conduits. In various aspects, this may assist in providing a flow of the high-pressure fluid into the interior 56 of the storage tank 46 at substantially the same pressure and flow rate at each inlet assembly 48, 50. In other aspects, the tank valve 64 (FIG. 4A) of each inlet assembly 48, 50 may optionally be configured to control the inlet rates into the interior. Various flow and control valves may be operated and/or controlled by a control system (not shown). FIG. 3C is a second schematic illustration of a dual-inlet system for refilling the high-pressure fluid storage tank 46. As shown in FIG. 3C, the inlet conduits 52, 54 may be provided with substantially the same length and width dimensions.

Figure 4A:
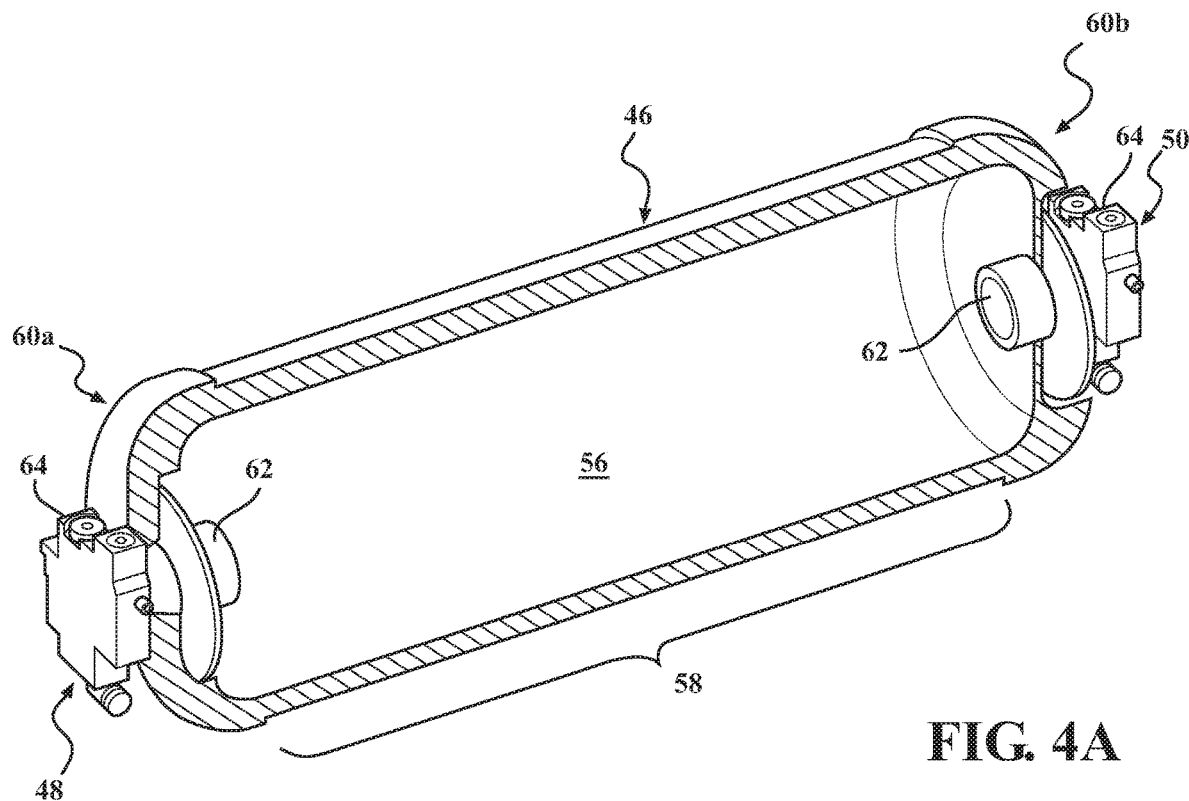
FIG. 4A is partial cut-away perspective view of the high-pressure fluid storage tank of FIG. 3.

FIG. 4A is partial cut-away perspective view of the high-pressure fluid storage tank 46 as shown in FIG. 3. Although the present technology is not meant to be limited to the specific shapes and designs of the storage tanks provided herein, in various aspects, the storage tanks may be provided with a substantially cylindrical shape for the refillable storage of various high-pressure fluids. In the figures of the exemplary storage tank 46 as shown, each storage tank 46 may be provided with a main body section 58 and with a first domed end portion 60a and a second domed end portion 60b disposed at opposite portions of the main body section 58. A first inlet assembly 48 and a second inlet assembly 50 may be provided at the respective first domed end portion 60a and the second domed end portion 60b. Each inlet assembly 48, 50 may be configured to provide fluid communication between a supply of a high-pressure fluid and an interior 56 of the storage tank 46.

Figure 4B:
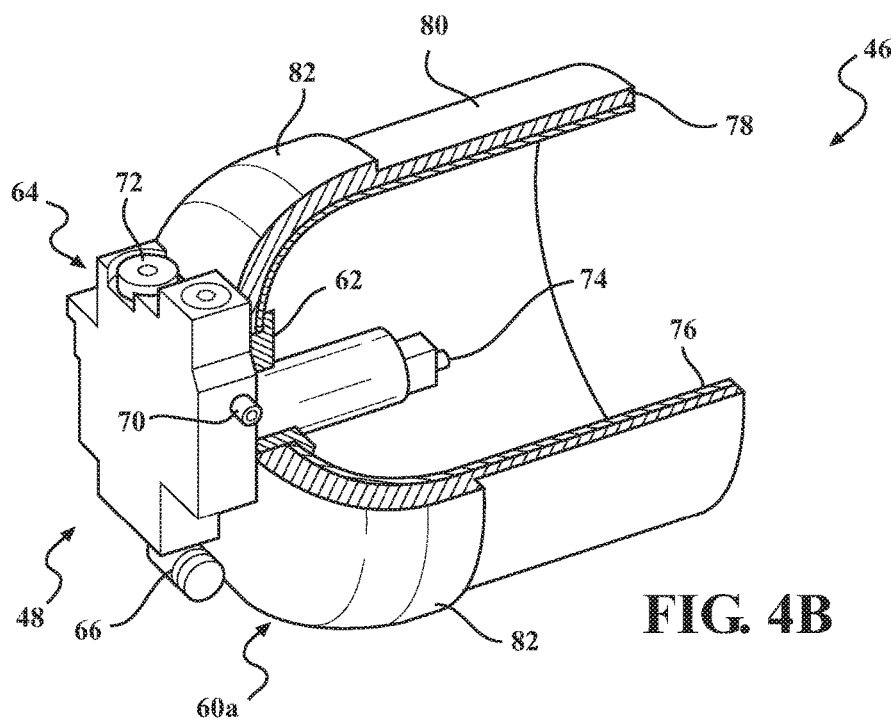
FIG. 4B is a magnified partial perspective view of an inlet assembly of the high-pressure fluid storage tank, including a tank valve disposed within a boss in a domed end portion of the high-pressure fluid storage tank.

FIG. 4B is a magnified partial perspective view of an exemplary inlet assembly 48 of the high-pressure fluid storage tank 46. In various aspects, each inlet assembly 48, 50 may include a tank valve 64 disposed within a boss 62. The structure of the tank valves 64 may vary based on design requirements, but generally will include a thermally activated pressure relief device 66, a gas inlet port 70, a gas outlet solenoid 72, and an in-tank gas temperature sensor 74. A pressure sensor may be provided on the three-way connection 39. With renewed reference to FIGS. 3B and 3C, each tank valve 64 of the respective inlet assembly 48, 50 is ultimately in fluid communication with the compressed fluid receptacle 38. During filling of the storage tank, the high-pressure fluid travels through the compressed fluid receptacle 38 and enters the interior of the storage tank simultaneously through the tank valve 64 of each of the first and second inlet assemblies 48, 50. In various aspects, the high-pressure fluid may be provided into the interior 56 of the storage tank at substantially the same flow rate through each inlet assembly 48, 50.

Figure 5:
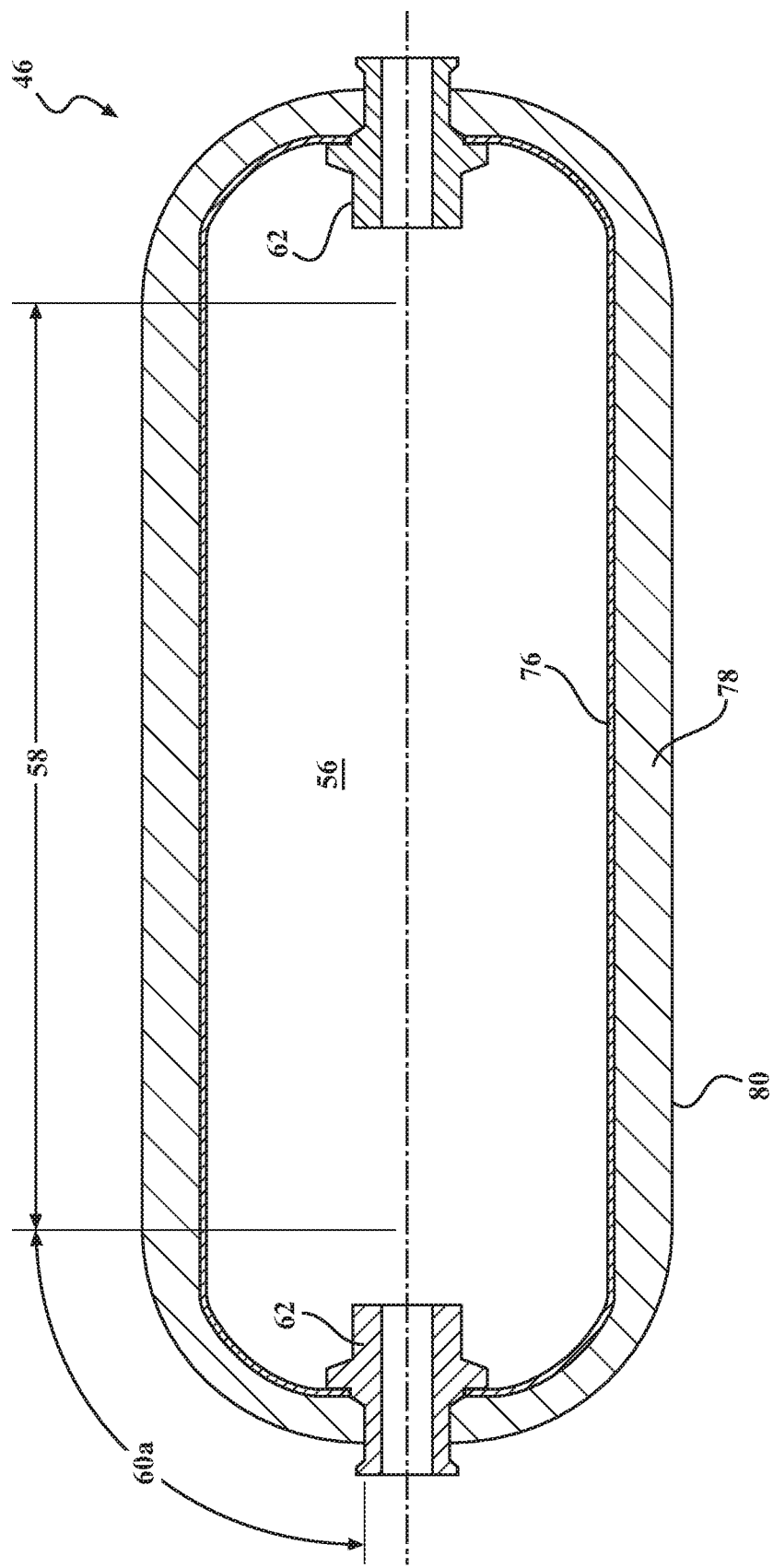
FIG. 5 is a cross-sectional view of an exemplary high-pressure storage tank illustrating the bosses located at opposing domed end portions.

FIG. 5 is a cross-sectional view of an exemplary high-pressure storage tank illustrating the bosses 62 generally located at a center of the opposing domed end portions 60a, 60b, as well as a multi-layered tank structure that extends from the main body section 58 to the opposing domed end portions 60a, 60b. Each domed end portion 60a, 60b generally decreases in diameter with increasing distance away from the main body section 58, with the smallest diameter portion defining an opening to receive a boss 62. Each boss 62 may be made of a lightweight structural material, such as aluminum, and may be shaped to provide fluid communication to the interior 56 of the storage tank 46. Each tank valve may be coupled to a boss 62.

As shown, the exemplary storage tank 46 may be provided with an innermost layer 76 being a liner or gas permeation barrier, for example, a liner formed of a high molecular weight polymer such as HPDE, or the like. In certain aspects, the innermost layer 76 may be made of a synthetic resin such as a nylon resin; alternatively, the liner could also be a metal such as stainless steel. One or more middle layer(s) 78 of the storage tank 46 may be formed of a reinforcing fiber, a carbon fiber or carbon composite shell, a hybrid composite material, or the like, suitable to provide the necessary structural rigidity. In addition to carbon fiber, the middle layer(s) 76 may include metal fibers, glass fibers, inorganic fibers such as alumina fibers, synthetic fibers such as aramid fibers, and natural fibers such as cotton. Any of these fibers may be used alone or in combination. The outermost layer or shell 80 of the storage tank 46 may be formed of an impact resistant material for optimal damage resistance. Additional reinforcement materials, such as foam covers 82, may be placed adjacent the dome end portions 60a, 60b for still further impact protection. Additional examples of multi-layered reinforced tank designs, materials useful for incorporating into high-pressure storage tanks, as well as manufacturing methods of the same, can be found in U.S. Pat. No. 9,879,825, assigned to Toyota Jidosha Kabushiki Kaisa, which is incorporated by reference herein in its entirety.

Figure 7:
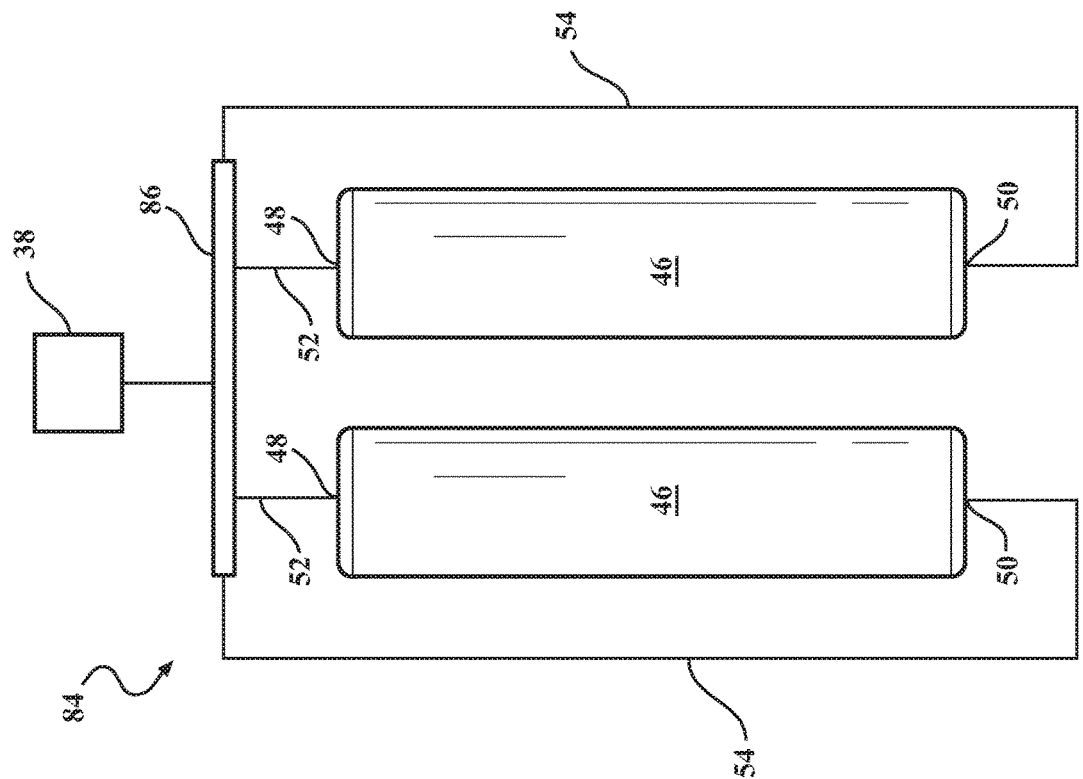
FIG. 7 is another schematic illustration of a dual-inlet system for refilling a pair of high-pressure fluid storage tanks, including a manifold.
Figure 6:
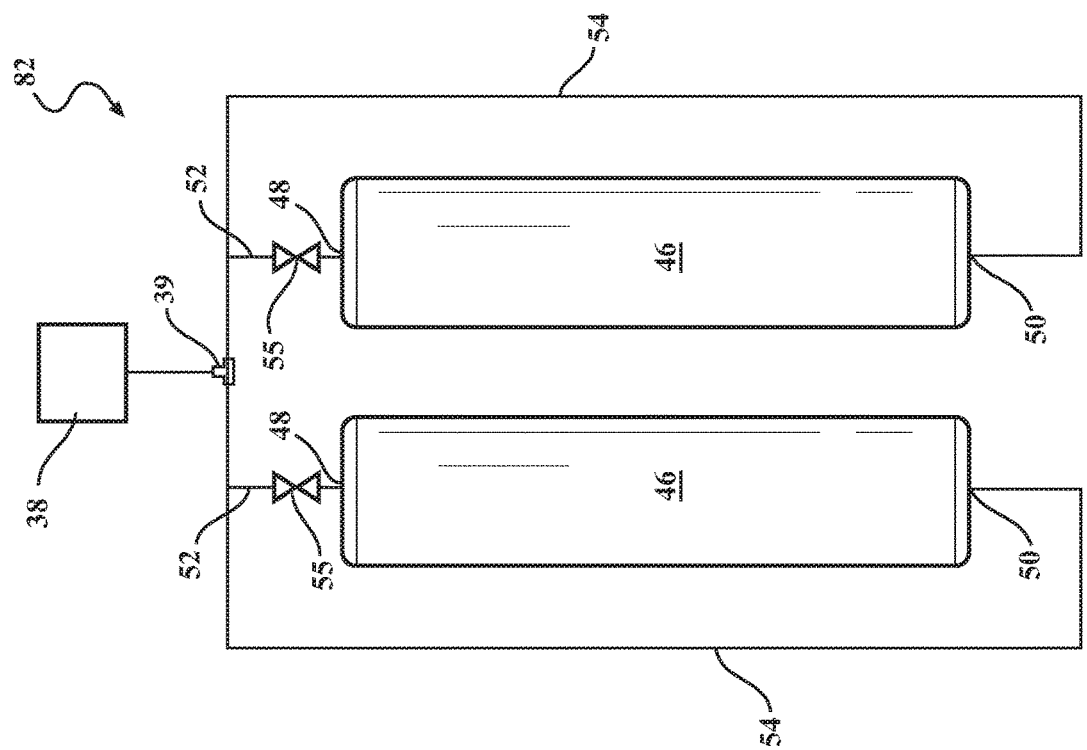
FIG. 6 is a schematic illustration of a dual-inlet system for refilling a pair of high-pressure fluid storage tanks.

FIG. 6 is a schematic illustration of a dual-inlet system 82 for refilling a pair of high-pressure fluid storage tanks 46. As shown in FIG. 6, an inlet conduit system can be designed and provided in order to direct the high-pressure fluid to the inlet assemblies 48, 50 of the respective tanks 46 according to specified parameters. As discussed above with respect to FIGS. 3B and 3C, the shape, size, and interior volume of the inlet conduits can affect the flow of the high-pressure fluid throughout the system. Thus, the inlet conduits 52, 54 are shaped and sized in order to ultimately provide the high-pressure fluid into the interior 56 of the storage tank 46 at substantially the same flow rate, temperature, and/or pressure. In order to accomplish this, in certain aspects, the technology may optionally include the use of control valves or manifolds, and in some instances, the inlet conduits 52, 54 may be provided with substantially the same length and width dimensions. FIG. 6 provides two optional control valves 55 that may be used to regulate the flow of the high-pressure fluid into the storage tank. FIG. 7 is another schematic illustration of a dual-inlet system 84 for refilling a pair of high-pressure fluid storage tanks, including the optional use of a manifold 86 permitting the flow of the high-pressure fluid throughout the various inlet conduits. For example, the manifold may be disposed between the compressed fluid receptacle 38 and at least one of the first and second inlet assemblies 48, 50 such that the manifold 86 permits the high-pressure fluid through the first and second inlet assemblies 48, 50 and into the interior 56 of the storage tank 46 at substantially the same flow rate, or as otherwise desired.

Figure 9:
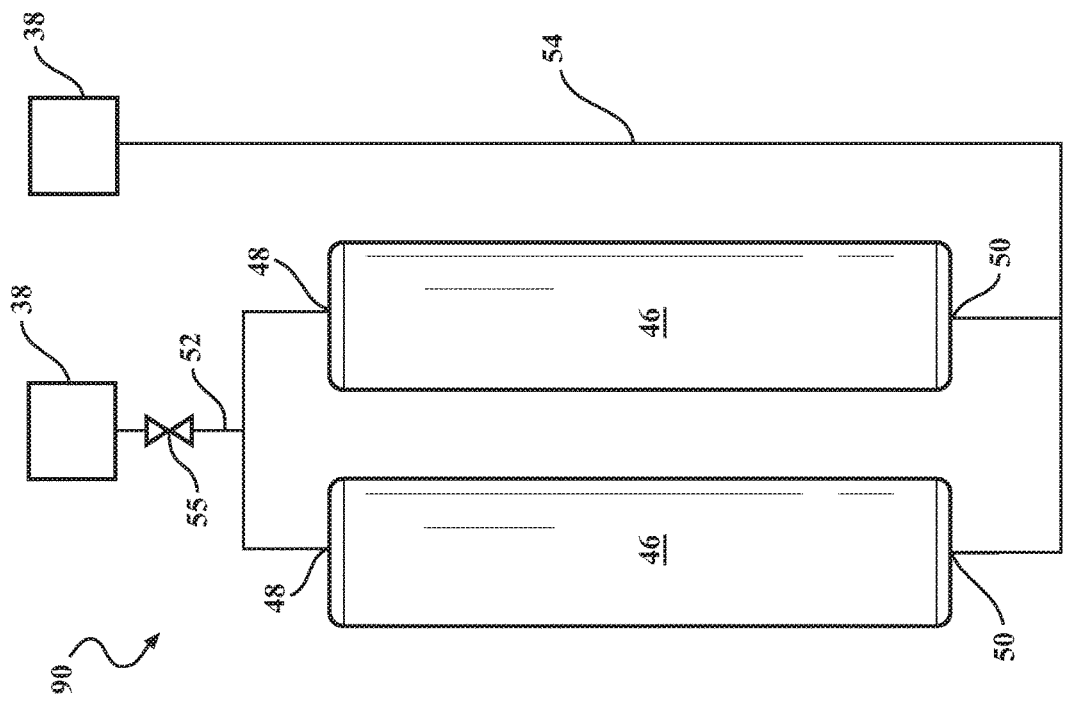
FIG. 9 is another schematic illustration of a dual-inlet system for refilling a pair of high-pressure fluid storage tanks using two compressed fluid receptacles.
Figure 8:
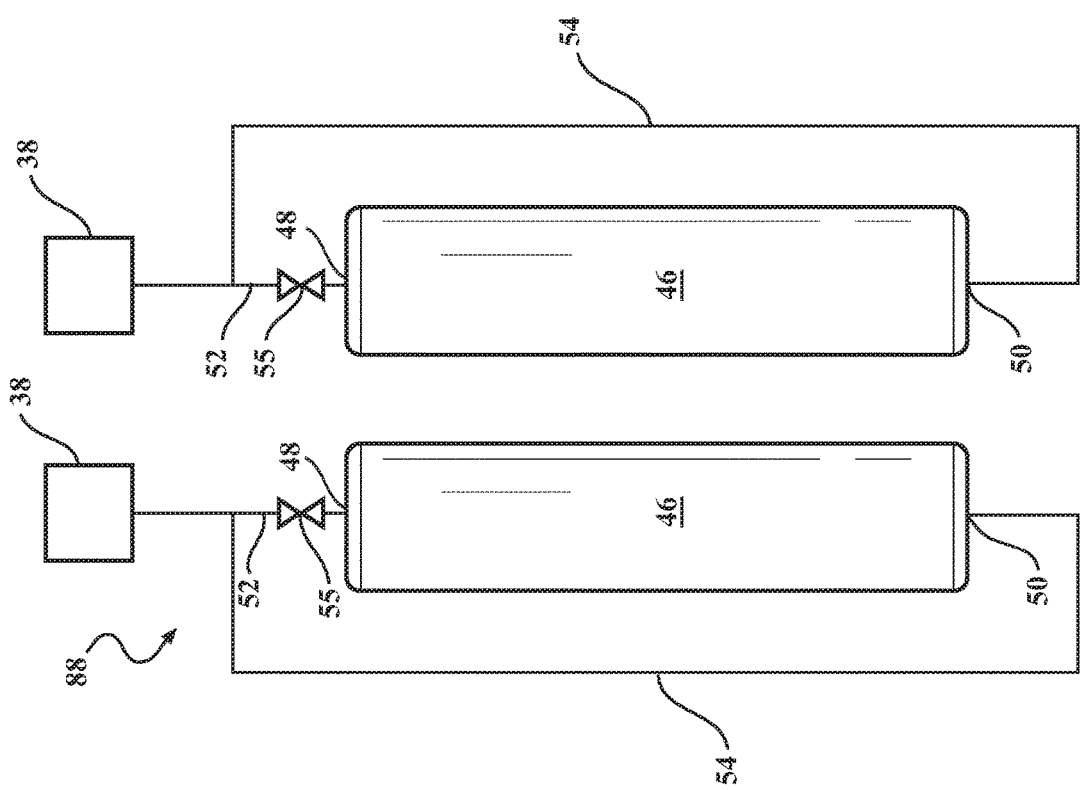
FIG. 8 is a schematic illustration of a dual-inlet system for refilling a pair of high-pressure fluid storage tanks using two compressed fluid receptacles.

FIGS. 8-9 are a schematic illustration of dual-inlet systems 88, 90 for refilling a pair of high-pressure fluid storage tanks using two compressed fluid receptacles 38. FIG. 8 illustrates each compressed fluid receptacle 38 configured for filling a different respective tank 46. Alternatively, the two compressed fluid receptacles 38 could be in fluid communication with each other (not specifically shown) with an appropriate coupling conduit or connector, such that the high-pressure fluid from each compressed fluid receptacle 38 is mixed or combined together prior to being directed to the individual inlet assemblies 48, 50 of the different tanks 46. FIG. 9 provides a dual-inlet system 90 for refilling a pair of high-pressure fluid storage tanks 46 using two compressed fluid receptacles 38, with each compressed fluid receptacle 38 being in fluid communication with a different inlet assembly. For example, one compressed fluid receptacle 38 may be configured to simultaneously fill a first inlet assembly 48 of each tank 46, and the other compressed fluid receptacle 38 may be configured to simultaneously fill a second inlet assembly 50 of each tank. Optional control valve(s) 55 may be used where desired to regulate the pressure and/or flow rate.

Figure 10:
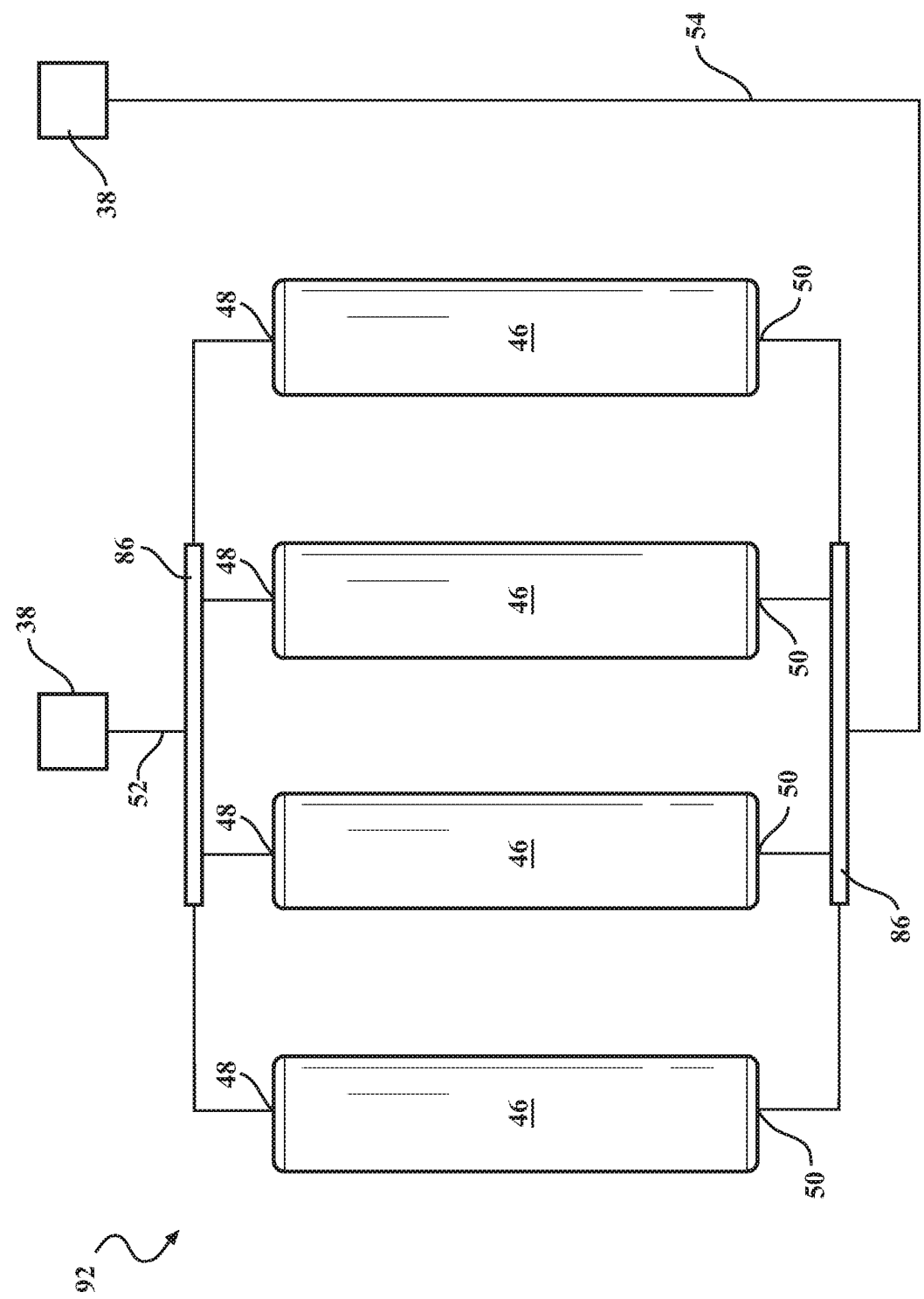
FIG. 10 is a schematic illustration of a dual-inlet system for refilling a plurality of high-pressure fluid storage tank shown using two compressed fluid receptacles and two manifolds.

It should be understood that the various different types, sizes, purposes, and thus power requirements of vehicles may provide for the need to have different configurations and designs of the dual-inlet high-pressure fluid storage containers of the present technology. FIG. 10 is yet another non-limiting schematic illustration of a dual-inlet system 92 for refilling a plurality of high-pressure fluid storage tanks, here using two compressed fluid receptacles 38 as well as two manifolds 86. As shown in FIG. 10, the system 92 includes a plurality of storage tanks 46 with a first compressed fluid receptacle 38 coordinating with a first manifold 86 to provide the high pressure fluid to a first set of respective inlet assemblies 48 of the storage tanks 46, and a second compressed fluid receptacle 38 coordinating with a second manifold 86 to provide the high pressure fluid to a second set of respective inlet assemblies 50 of the storage tanks 46.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A high-pressure fluid storage tank assembly with dual inlet refilling, the storage tank comprising:
   a main body section;
   a first domed end portion and a second domed end portion disposed at opposite portions of the main body section;
   a first inlet assembly and a second inlet assembly provided at the respective first domed end portion and the second domed end portion, each inlet assembly configured to provide fluid communication between a supply of a high-pressure fluid outside the storage tank and an interior of the storage tank, such that the high-pressure fluid travels through a compressed fluid receptacle and enters the interior of the storage tank simultaneously through each of the first and second inlet assemblies from outside the storage tank; and
   a flow control valve positioned to control a flow of high-pressure fluid only into the first inlet assembly, with no flow control valve positioned to control flow of high-pressure fluid into the second inlet assembly.

2. The high-pressure fluid storage tank assembly according to claim 1, wherein each inlet assembly comprises a tank valve disposed within a boss, with each tank valve being in fluid communication with the compressed fluid receptacle.

3. The high-pressure fluid storage tank assembly according to claim 2, further comprising a pair of inlet conduits residing externally of the storage tank and providing fluid communication between the compressed fluid receptacle and the respective tank valves of the of the first and second inlet assemblies.

4. The high-pressure fluid storage tank assembly according to claim 3, wherein the pair of inlet conduits are shaped and sized in order to provide the high-pressure fluid into the interior of the storage tank at substantially the same flow rate.

5. The high-pressure fluid storage tank assembly according to claim 3, wherein the pair of inlet conduits are provided with the same length and width dimensions.

6. The high-pressure fluid storage tank assembly according to claim 2, further comprising a manifold disposed between the compressed fluid receptacle and at least one of the first and second inlet assemblies, wherein the manifold permits a flow of the high-pressure fluid through the first and second inlet assemblies and into the interior of the storage tank at substantially the same flow rate.

7. The high-pressure fluid storage tank assembly according to claim 2, comprising two compressed fluid receptacles, each compressed fluid receptacle being in fluid communication with a different one of the first and second inlet assemblies.

8. The high-pressure fluid storage tank assembly according to claim 1, wherein the high-pressure fluid enters the interior of the storage tank from an exterior of the storage tank simultaneously through each of the first domed end portion and the second domed end portion, through each of the first and second inlet assemblies.

9. A dual-inlet system for refilling a high-pressure fluid storage tank, the system comprising:
   a high-pressure fluid storage tank including a main body section and defining an interior for storing a high-pressure fluid;
   a single compressed fluid receptacle configured for receiving a high-pressure fluid from a supply source;
   a first inlet assembly and a second inlet assembly, each inlet assembly configured to provide fluid communication between the single compressed fluid receptacle and the interior of the storage tank, such that the high-pressure fluid travels through the compressed fluid receptacle to enter from an exterior of the storage tank into the interior of the storage tank simultaneously through each inlet assembly;
   a single manifold connected between the receptacle and the storage tank;
   a first inlet conduit extending from the single manifold directly to the first inlet assembly; and
   a second inlet conduit separate from the first inlet conduit and extending from the single manifold directly to the second inlet assembly,
   wherein the system is structured so that each of the first and second inlet conduits receives high-pressure fluid only from the single receptacle and through the single manifold.

10. The dual-inlet system for refilling the high-pressure fluid storage tank according to claim 9, wherein the storage tank comprises a first domed end portion and a second domed end portion disposed at opposite portions of the main body section that cooperate to define the interior, wherein the first inlet assembly is located at the first domed end portion, and the second inlet assembly is located at the second domed end portion.

11. The dual-inlet system for refilling the high-pressure fluid storage tank according to claim 10, wherein each inlet assembly comprises a tank valve disposed within a boss, with each tank valve configured to direct fluid communication between the compressed fluid receptacle and the interior of the storage tank.

12. The dual-inlet system for refilling the high-pressure fluid storage tank according to claim 11, wherein the first inlet conduit provides fluid communication between the compressed fluid receptacle and the tank valve of the first inlet assembly, and the second inlet conduit provides fluid communication between the compressed fluid receptacle and the tank valve of the second inlet assembly.

13. The dual-inlet system for refilling the high-pressure fluid storage tank according to claim 12, wherein the single manifold is disposed between the compressed fluid receptacle and each of the first and second inlet assemblies, and wherein the single manifold permits a flow of the high-pressure fluid through the each of the first and second inlet assemblies and into the interior of the storage tank at substantially the same flow rate.

14. The dual-inlet system for refilling the high-pressure fluid storage tank according to claim 12, comprising two compressed fluid receptacles, each compressed fluid receptacle being in fluid communication with a respective one of the first inlet assembly and the second inlet assembly.

15. The dual-inlet system for refilling the high-pressure fluid storage tank according to claim 10, wherein each of the first and second inlet conduits is shaped and sized in order to provide the high-pressure fluid into the interior of the storage tank at substantially the same flow rate.

16. The dual-inlet system for refilling the high-pressure fluid storage tank according to claim 9, wherein each of the first and second inlet conduits is provided with the same length and width dimensions.

17. The dual-inlet system for refilling the high-pressure fluid storage tank according to claim 9, comprising two high-pressure fluid storage tanks, each storage tank including:
- a main body section and defining an interior for storing a high-pressure fluid;
- a first inlet assembly and a second inlet assembly, each inlet assembly configured to provide fluid communication between the compressed fluid receptacle and the interior of the respective storage tank simultaneously through each inlet assembly;
- a respective first inlet conduit extending from the single manifold directly to the first inlet assembly; and
- a respective second inlet conduit separate from the first inlet conduit and extending from the single manifold directly to the second inlet assembly.

18. A vehicle comprising the dual-inlet system for refilling a high-pressure fluid storage tank according to claim 9.

19. A method for refilling a high-pressure fluid storage tank, the method comprising:
- providing a high-pressure fluid storage tank including: a main body section defining an interior for storing a high-pressure fluid, a first inlet assembly, a second inlet assembly;
- connecting a supply of a high-pressure fluid to a compressed fluid receptacle in fluid communication with the first and second inlet assemblies;
- connecting the compressed fluid receptacle a flow control valve positioned to control a flow of high-pressure fluid only into the first inlet assembly, with no flow control valve positioned to control flow of high-pressure fluid into the second inlet assembly; and
- directing the high-pressure fluid from an exterior of the storage tank into the interior of the storage tank simultaneously through the flow control valve and the first inlet assembly, and also through the second inlet assembly.

20. The method according to claim 19, wherein the high-pressure fluid comprises hydrogen gas, and the high-pressure storage tank is disposed in a vehicle.

21. The method according to claim 19, comprising directing the high-pressure fluid to the interior of the storage tank simultaneously through each of the first and second inlet assemblies at substantially the same flow rate.

* * * * *

UNITED STATES PATENT AND TRADEMARK OFFICE
CERTIFICATE OF CORRECTION

PATENT NO. : 11,649,927 B2
APPLICATION NO. : 16/777021
DATED : May 16, 2023
INVENTOR(S) : Jacquelyn Birdsall It is certified that error appears in the above-identified patent and that said Letters Patent is hereby corrected as shown below:

In the Claims

Claim 19, Column 12, Line 12, please add "and" after "," and before "a second inlet assembly"

Signed and Sealed this
Seventh Day of May, 2024

Katherine Kelly Vidal
*Director of the United States Patent and Trademark Office*